United States Patent
Lee

(10) Patent No.: US 10,467,485 B2
(45) Date of Patent: Nov. 5, 2019

(54) DRIVING LANE GUIDANCE SYSTEM AND CONTROL METHOD THEREOF

(71) Applicant: HYUNDAI MOBIS CO., LTD., Seoul (KR)

(72) Inventor: Jeong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/937,222

(22) Filed: Mar. 27, 2018

(65) Prior Publication Data

US 2018/0307920 A1    Oct. 25, 2018

(30) Foreign Application Priority Data

Apr. 25, 2017 (KR) .................. 10-2017-0052705

(51) Int. Cl.

| | |
|---|---|
| *G08G 1/0967* | (2006.01) |
| *G06K 9/00* | (2006.01) |
| *G08G 1/16* | (2006.01) |
| *B60W 30/00* | (2006.01) |
| *G08G 1/0962* | (2006.01) |
| *B62D 15/02* | (2006.01) |

(52) U.S. Cl.
CPC ......... *G06K 9/00798* (2013.01); *B60W 30/00* (2013.01); *B62D 15/0255* (2013.01); *G06K 9/00805* (2013.01); *G08G 1/0962* (2013.01); *G08G 1/0967* (2013.01); *G08G 1/166* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 7,216,023 | B2 * | 5/2007 | Akita ............... | B62D 15/025 348/148 |
| 10,176,387 | B2 * | 1/2019 | Kawasaki ......... | G06K 9/00798 |
| 2004/0098197 | A1 * | 5/2004 | Matsumoto ........ | B60T 8/17557 701/301 |
| 2005/0125121 | A1 * | 6/2005 | Isaji ................. | B60W 30/08 701/36 |
| 2005/0125153 | A1 * | 6/2005 | Matsumoto ........ | B60T 8/17557 701/300 |
| 2005/0273264 | A1 * | 12/2005 | Gem ................. | B60W 40/08 701/301 |
| 2007/0233386 | A1 * | 10/2007 | Saito ................ | B62D 15/025 701/300 |

(Continued)

FOREIGN PATENT DOCUMENTS

KR    10-2016-0117984 A    10/2016

*Primary Examiner* — Jonathan M Dager
(74) *Attorney, Agent, or Firm* — Knobbe Martens Olson & Bear LLP

(57) ABSTRACT

A driving lane guidance system may include: a navigation information receiver configured to receive navigation information; a DAS sensor configured to sense forward and surrounding states of an ego vehicle; a controller configured to determine a driving lane of a highway based on the navigation information, sense a lane change and a neighboring vehicle based on the forward and surrounding states inputted from the DAS sensor, and correct the driving lane; and a display unit configured to display the driving lane determined or corrected by the controller.

10 Claims, 2 Drawing Sheets

(56) References Cited

U.S. PATENT DOCUMENTS

| | | | | |
|---|---|---|---|---|
| 2010/0253541 | A1* | 10/2010 | Seder | G01S 13/723 |
| | | | | 340/905 |
| 2010/0253598 | A1* | 10/2010 | Szczerba | G01S 13/723 |
| | | | | 345/7 |
| 2015/0360684 | A1* | 12/2015 | Matsuno | B60Q 9/00 |
| | | | | 701/23 |
| 2015/0360721 | A1* | 12/2015 | Matsuno | B62D 15/0255 |
| | | | | 701/41 |
| 2016/0129840 | A1* | 5/2016 | Schofield | B60Q 1/346 |
| | | | | 348/148 |
| 2016/0159351 | A1* | 6/2016 | Lee | B60K 35/00 |
| | | | | 701/93 |
| 2016/0297447 | A1* | 10/2016 | Suzuki | B60W 30/16 |
| 2017/0305349 | A1* | 10/2017 | Naboulsi | B60R 1/025 |
| 2017/0334460 | A1* | 11/2017 | Arakawa | G02B 27/01 |
| 2018/0037230 | A1* | 2/2018 | Otake | B60W 10/06 |
| 2018/0093676 | A1* | 4/2018 | Emura | G06K 9/00288 |
| 2018/0222423 | A1* | 8/2018 | Takae | G08G 1/167 |
| 2018/0281804 | A1* | 10/2018 | Talamonti | B62D 15/0255 |
| 2018/0286095 | A1* | 10/2018 | Kusayanagi | B60R 1/00 |
| 2019/0080611 | A1* | 3/2019 | Yamada | G08G 1/166 |
| 2019/0114915 | A1* | 4/2019 | Patel | G01C 21/3658 |

* cited by examiner

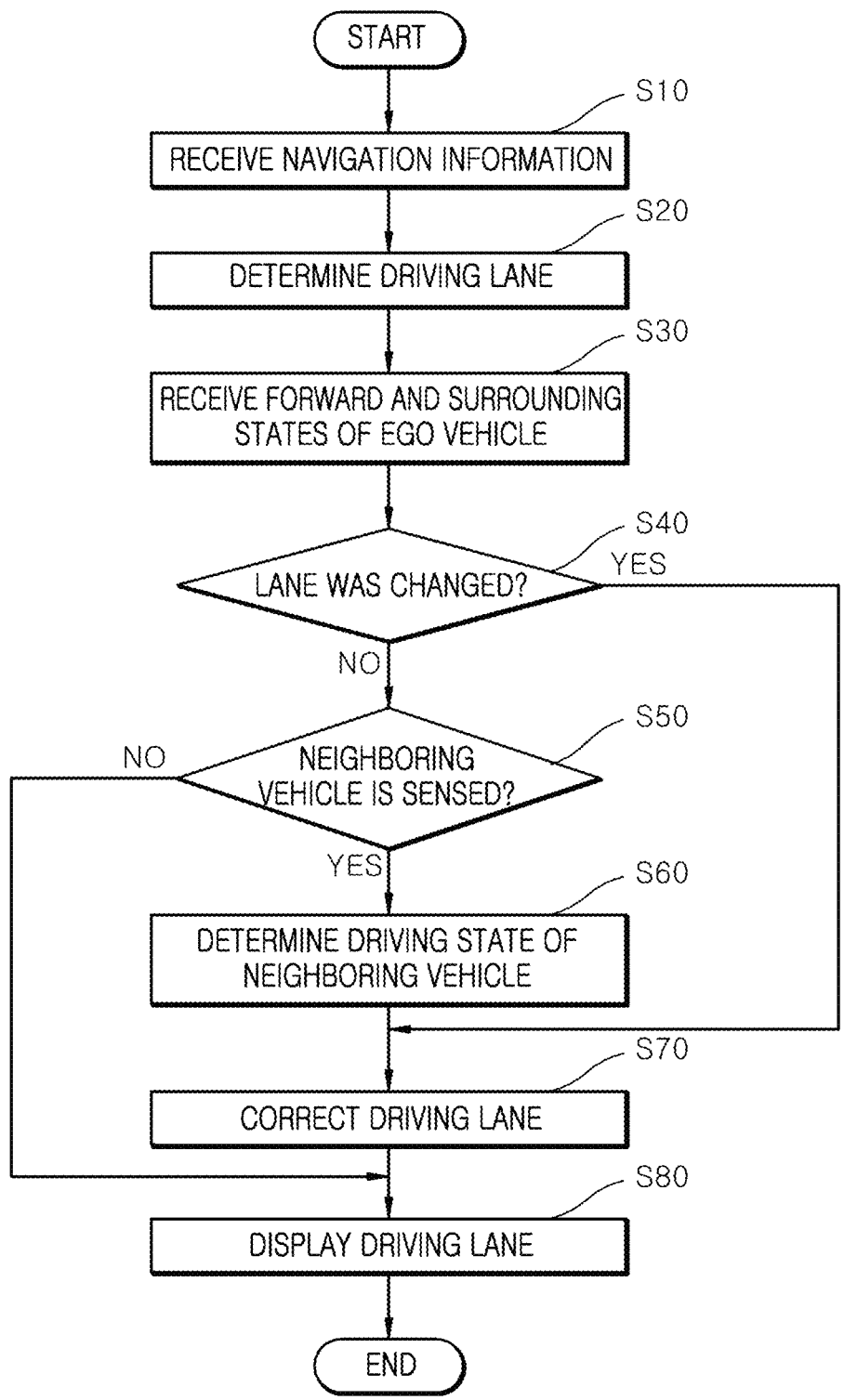

DRIVING LANE GUIDANCE SYSTEM AND CONTROL METHOD THEREOF

CROSS-REFERENCES TO RELATED APPLICATIONS

The present application claims priority to Korean application number 10-2017-0052705, filed on Apr. 25, 2017, which is incorporated by reference in its entirety.

BACKGROUND OF THE INVENTION

The present invention relates to a driving lane guidance system and a control method thereof, and more particularly, to a driving lane guidance system which is capable of continuously correcting a driving lane of a vehicle traveling on a highway, based on driver assistant system (DAS) sensor information and navigation information, and providing the corrected driving lane information, and a control method thereof.

Recently, the development of various sensors and recognition systems has commercialized an advanced driver assistant system (ADAS) which is mounted in a vehicle.

A lane change guidance system using the ADAS acquires information on blind spots at the rear and sides of a vehicle through a plurality of sensors, and shows a state of safety during a driver's lane change through a separate monitor or warning sound. That is, an advanced safety vehicle (AVS) system has been developed and used, which senses the location of a neighboring vehicle using a distance sensor, and informs a driver of the sensed location information of the neighboring vehicle.

Another example of the ADAS may include a highway driving assist system which assists a vehicle traveling on a highway through automatic steering control and automatic speed control, such that the vehicle can maintain a lane, a distance from the vehicle ahead, and a preset speed. The highway driving assist system may additionally support a lane change in response to a lane change command, based on the lane change guidance system.

The related art is disclosed in Korean Patent Publication No. 2016-0117984 published on Oct. 11, 2016 and entitled "Lane change guidance system".

When such a highway driving assist system or autonomous vehicle supports a lane change according to a lane change command, correct information on the lane on which the vehicle is traveling can raise the reliability of the lane change. Thus, the highway driving assist system or the autonomous vehicle needs to correctly determine the driving lane of the ego vehicle, and provide the information on the driving lane.

SUMMARY OF THE INVENTION

Embodiments of the present invention are directed to a driving lane guidance system which is capable of continuously correcting a driving lane of a vehicle traveling on a highway, based on DAS sensor information and navigation information, and providing the corrected driving lane information, and a control method thereof.

In one embodiment, a driving lane guidance system may include: a navigation information receiver configured to receive navigation information; a DAS sensor configured to sense forward and surrounding states of an ego vehicle; a controller configured to determine a driving lane of a highway based on the navigation information, sense a lane change and a neighboring vehicle based on the forward and surrounding states inputted from the DAS sensor, and correct the driving lane; and a display unit configured to display the driving lane determined or corrected by the controller.

The navigation information may include one or more pieces of information among the main line, a branch road, a merging road, the number of lanes, and the curvature of the highway.

The DAS sensor may include one or more of a front camera, a front radar, a rear radar and a side radar.

The driving lane guidance system may further include an output unit configured to output the driving lane determined or corrected by the controller to a peripheral control device.

The controller may determine a driving state of the neighboring vehicle, based on a distance to the neighboring vehicle, a relative velocity between the neighboring vehicle and the ego vehicle, the driving direction of the neighboring vehicle, and a sensing time.

The controller may display the neighboring vehicle sensed through the DAS sensor with the driving lane.

In another embodiment, a control method of a driving lane guidance system may include: receiving, by a controller, navigation information from a navigation information receiver; determining, by the controller, a driving lane based on the navigation information; receiving, by the controller, forward and surrounding states of an ego vehicle from a DAS sensor; correcting, by the controller, the driving lane when a lane change is sensed based on the forward and surrounding states of the ego vehicle; determining, by the controller, a driving state of a neighboring vehicle when the neighboring vehicle is sensed based on the forward and surrounding states of the ego vehicle, and correcting the driving lane; and displaying, by the controller, the driving lane.

The navigation information may include one or more pieces of information among the main line, a branch road, a merging road, the number of lanes, and the curvature of a highway.

In the determining of the driving lane, the controller may determine whether the ego vehicle entered the main line of the highway, based on the navigation information, and then decide the driving lane from the number of lanes.

The control method may further include receiving, by the controller, a forward image from the DAS sensor after the ego vehicle entered the main line, sensing the total number of lanes from the forward image, comparing the sensed total number of lanes to the number of lanes sensed through the navigation information, and correcting the number of lanes.

In the correcting of the driving lane, the controller may determine the driving state of the neighboring vehicle, based on a distance to the neighboring vehicle, a relative velocity between the neighboring vehicle and the ego vehicle, the driving direction of the neighboring vehicle, and a sensing time.

The control method may further include outputting, by the controller, the driving lane to a peripheral control device.

The control method may further include displaying, by the controller, forward and neighboring vehicles sensed through the DAS sensor with the driving lane.

BRIEF DESCRIPTION OF THE DRAWINGS

FIG. 2 is a flowchart illustrating a control method of a driving lane guidance system in accordance with an embodiment of the present invention.

DESCRIPTION OF SPECIFIC EMBODIMENTS

Figure 1:
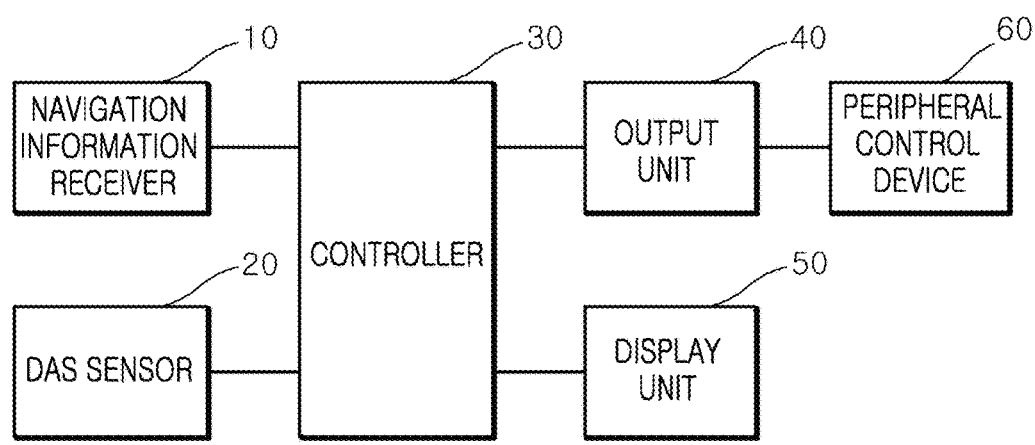
FIG. 1 is a block configuration diagram illustrating a driving lane guidance system in accordance with an embodiment of the present invention.

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block configuration diagram illustrating a driving lane guidance system in accordance with an embodiment of the present invention.

As illustrated in FIG. 1, the driving lane guidance system in accordance with the embodiment of the present invention may include a navigation information receiver 10, a DAS sensor 20, a controller 30, a display unit 50 and an output unit 40.

The navigation information receiver 10 may receive navigation information and provide the received navigation information to the controller 30.

The navigation information may include a DAS map containing one or more pieces of information among the main line, a branch road, a merging road, the number of lanes, and the curvature of a highway.

The DAS sensor 20 may sense the front and surroundings of an ego vehicle, and provide the sensing results to the controller 30.

The DAS sensor 20 may include a front camera and front radar for monitoring the front of the ego vehicle and a rear radar and side radars for monitoring the rear and sides of the ego vehicle.

The controller 30 may determine a driving lane of the highway from the navigation information, sense a lane change and neighboring vehicles based on the forward and surrounding situations inputted from the DAS sensor 20, and correct the driving lane.

The controller 30 may determine whether the vehicle entered the main line of the highway and the number of lanes, based on the navigation information, and decide the driving lane.

In other words, when the vehicle entered the main line of the highway, the controller 30 may determine that the last lane among the lanes of the highway is the driving lane.

At this time, the controller 30 may compare the number of lanes, inputted from the navigation information immediately after the entry into the main line of the highway, to the total number of lanes sensed from the forward image received from the DAS sensor 20, and then correct the number of lanes.

Then, when a lane change is sensed based on the forward and surrounding states of the ego vehicle, inputted from the DAS sensor 20, the controller 30 may correct the driving lane by adding or subtracting a lane in the lane change direction.

Furthermore, the controller 30 may determine the driving state of a neighboring vehicle based on a distance to the neighboring vehicle, the relative velocity between the ego vehicle and the neighboring vehicle, the driving direction of the neighboring vehicle and a sensing time, and correct the driving lane when information obtained through the driving state of the neighboring vehicle is different from the driving lane.

For example, the controller 30 may first determine that the driving lane of the vehicle is the fourth lane of a four-lane road, and then determine the driving state of a neighboring vehicle, inputted from the DAS sensor 20. In this case, when a vehicle traveling at the right side of the ego vehicle is sensed, the controller 30 may correct the driving lane from the fourth lane to the second or third lane according to the driving state of the neighboring vehicle.

For another example, the controller 30 may first determine that the driving lane of the vehicle is the first lane of the four-lane road, and then determine the driving state of a neighboring vehicle, inputted from the DAS sensor 20. When a vehicle traveling at the left side of the ego vehicle is sensed, the controller 30 may correct the driving lane from the first lane to the second or third lane according to the driving state of the neighboring vehicle.

The display unit 50 may display the driving lane determined or corrected by the controller 30, such that the driver can recognize the driving lane of the ego vehicle.

At this time, the controller 30 may display forward and neighboring vehicles sensed from the DAS sensor 20 with the driving lane, such that the driver can recognize the driving states of the neighboring vehicles and pay attention when changing the driving lane.

The controller 30 may display that a neighboring vehicle is trying a lane change or passing the ego vehicle.

The output unit 40 may output the driving lane determined or corrected by the controller 30 to a peripheral control device 60, such that the peripheral control device 60 can control the driving lane with high reliability.

As described above, the driving lane guidance system in accordance with the embodiment of the present invention can continuously correct the driving lane of the vehicle traveling on a highway, based on the DAS sensor information and the navigation information, and provide the corrected lane information. Thus, when a highway driving assist system or autonomous vehicle supports a lane change according to a lane change command, the reliability and stability can be improved.

FIG. 2 is a flowchart illustrating a control method of a driving lane guidance system in accordance with an embodiment of the present invention.

As illustrated in FIG. 2, the control method of the driving lane guidance system in accordance with the present embodiment may begin with step S10 in which the controller 30 receives navigation information from the navigation information receiver 10.

The navigation information may include a DAS map containing one or more pieces of information among the main line, a branch road, a merging road, the number of lanes, and the curvature of a highway.

After receiving the navigation information at step S10, the controller 30 may determine a driving lane based on the navigation information at step S20.

The controller 30 may determine whether the ego vehicle entered the main line of the highway, based on the navigation information. When the ego vehicle entered the main line, the controller 30 may determine that the last lane is the driving lane, based on the number of lanes.

At this time, the controller 30 may compare the number of lanes, inputted from the navigation information immediately after the entry into the main line of the highway, to the total number of lanes sensed from the forward image received from the DAS sensor 20, and then correct the number of lanes.

After determining the driving lane at step S20, the controller 30 may receive the forward and surrounding states of the ego vehicle from the DAS sensor 20 at step S30.

The controller 30 may determine whether the lane was changed, based on the forward and surrounding states of the ego vehicle, which are inputted from the DAS sensor 20, at step S40.

When it is determined at step S40 that the lane was changed, the controller 30 may correct the driving lane by adding or subtracting a lane in the lane change direction, at step S70.

On the other hand, when it is determined at step S40 that the lane was not changed, the controller 30 may sense a neighboring vehicle based on the forward and surrounding states of the ego vehicle, inputted from the DAS sensor 20, at step S50.

When no neighboring vehicles are sensed at step S50, the controller 30 may display the driving lane on the display unit 50 such that a driver can recognize the driving lane, at step S80.

On the other hand, when a neighboring vehicle is sensed at step S50, the controller 30 may determine the driving state of the neighboring vehicle based on a distance to the neighboring vehicle, the relative velocity between the neighboring vehicle and the ego vehicle, the driving direction of the neighboring vehicle, and a sensing time, at step S60.

When the determination result of step S60 indicates that information obtained through the driving state of the neighboring vehicle is different from the driving lane, the controller 30 corrects the driving lane at step S70.

For example, the controller 30 may first determine that the driving lane of the vehicle is the fourth lane of a four-lane road, and then determine the driving state of a neighboring vehicle, inputted from the DAS sensor 20. In this case, when a vehicle traveling at the right side of the ego vehicle is sensed, the controller 30 may correct the driving lane from the fourth lane to the second or third lane according to the driving state of the neighboring vehicle.

For another example, the controller 30 may first determine that the driving lane of the vehicle is the first lane of the four-lane road, and then determine the driving state of a neighboring vehicle, inputted from the DAS sensor 20. When a vehicle traveling at the left side of the ego vehicle is sensed, the controller 30 may correct the driving lane from the first lane to the second or third lane according to the driving state of the neighboring vehicle.

The controller 30 may output the driving lane determined at step S20 or the driving lane determined at step S70 through the display unit 50, such that the driver can recognize the driving lane of the ego vehicle, at step S80.

In this case, the controller 30 may display forward and neighboring vehicles sensed from the DAS sensor 20 with the driving lane, such that the driver can recognize the driving states of the neighboring vehicles and pay attention when changing the driving lane.

At this time, the controller 30 may display that a neighboring vehicle is trying a lane change or passing the ego vehicle.

The controller 30 may output the determined or corrected driving lane to the peripheral control device 60 through the output unit 40, such that the peripheral control device 60 can control the driving lane with high reliability.

As described above, the control method of the driving lane guidance system in accordance with the embodiment of the present invention can continuously correct the driving lane of the vehicle traveling on a highway, based on the DAS sensor information and the navigation information, and provide the corrected lane information. Thus, when a highway driving assist system or autonomous vehicle supports a lane change according to a lane change command, the reliability and stability can be improved.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A driving lane guidance system comprising:
   a navigation information receiver configured to receive navigation information;
   a driver assistant system (DAS) sensor configured to sense forward and surrounding states of an ego vehicle;
   a controller configured to determine a driving lane of a highway based on the navigation information, sense a lane change and a neighboring vehicle based on the forward and surrounding states inputted from the DAS sensor, and correct the driving lane; and
   a display unit configured to display the driving lane determined or corrected by the controller,
   wherein the navigation information comprises one or more pieces of information among a main line, a branch road, a merging road, lanes, and a curvature of the highway,
   wherein the controller is further configured to determine whether the ego vehicle entered the main line of the highway, based on the navigation information, and then to decide the driving lane among the lanes.

2. The driving lane guidance system of claim 1, wherein the DAS sensor comprises one or more of a front camera, a front radar, a rear radar and a side radar.

3. The driving lane guidance system of claim 1, further comprising an output unit configured to output the driving lane determined or corrected by the controller to a peripheral control device.

4. The driving lane guidance system of claim 1, wherein the controller determines a driving state of the neighboring vehicle, based on a distance to the neighboring vehicle, a relative velocity between the neighboring vehicle and the ego vehicle, a driving direction of the neighboring vehicle, and a sensing time.

5. The driving lane guidance system of claim 1, wherein the controller displays the neighboring vehicle sensed through the DAS sensor with the driving lane.

6. A control method of a driving lane guidance system, comprising:
   receiving, by a controller, navigation information from a navigation information receiver;
   determining, by the controller, a driving lane based on the navigation information;
   receiving, by the controller, forward and surrounding states of an ego vehicle from a driver assistant system (DAS) sensor;
   correcting, by the controller, the driving lane when a lane change is sensed based on the forward and surrounding states of the ego vehicle;
   determining, by the controller, a driving state of a neighboring vehicle when the neighboring vehicle is sensed based on the forward and surrounding states of the ego vehicle, and correcting the driving lane; and
   displaying, by the controller, the driving lane, wherein the navigation information comprises one or more pieces of information among a main line, a branch road, a merging road, lanes, and a curvature of a highway, wherein in the determining of the driving lane, the controller determines whether the ego vehicle entered the main line of the highway, based on the navigation information, and then decides the driving lane among the lanes.

7. The control method of claim 6, further comprising receiving, by the controller, a forward image from the DAS sensor after the ego vehicle entered the main line, sensing the total number of lanes from the forward image, comparing the sensed total number of lanes to the navigation information on the total number of lanes, and correcting the navigation information on the total number of lanes.

8. The control method of claim 6, wherein in the correcting of the driving lane, the controller determines the driving state of the neighboring vehicle, based on a distance to the neighboring vehicle, a relative velocity between the neighboring vehicle and the ego vehicle, a driving direction of the neighboring vehicle, and a sensing time.

9. The control method of claim 6, further comprising outputting, by the controller, the driving lane to a peripheral control device.

10. The control method of claim 6, further comprising displaying, by the controller, forward and neighboring vehicles sensed through the DAS sensor with the driving lane.

* * * * *